US006651950B2

(12) United States Patent
Stoecklein et al.

(10) Patent No.: US 6,651,950 B2
(45) Date of Patent: Nov. 25, 2003

(54) VALVE FOR CONTROLLING LIQUIDS

(75) Inventors: Wolfgang Stoecklein, Stuttgart (DE); Dietmar Schmieder, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 10/018,655

(22) PCT Filed: Mar. 21, 2001

(86) PCT No.: PCT/DE01/01074

§ 371 (c)(1),
(2), (4) Date: Mar. 11, 2002

(87) PCT Pub. No.: WO01/81751

PCT Pub. Date: Nov. 1, 2001

(65) Prior Publication Data

US 2003/0098429 A1 May 29, 2003

(30) Foreign Application Priority Data

Apr. 20, 2000 (DE) ........................................ 100 19 767

(51) Int. Cl.$^7$ .......................... F02M 47/02; F16K 31/12
(52) U.S. Cl. .............................. 251/57; 251/58; 251/62
(58) Field of Search .................................. 251/12–63.6

(56) References Cited

U.S. PATENT DOCUMENTS 5,697,554 A 12/1997 Auwaerter
6,062,533 A * 5/2000 Kappel ........................ 251/57
6,457,699 B1 * 10/2002 Stoecklein ............. 251/129.06
6,464,202 B1 * 10/2002 Boecking ............... 251/129.06
6,530,555 B1 * 3/2003 Stoecklein et al. ........... 251/57
6,547,213 B1 * 4/2003 Heinz et al. .................. 251/57

FOREIGN PATENT DOCUMENTS

| | | |
|---|---|---|
| DE | 44 06 522 C | 7/1995 |
| DE | 197 32 802 | 2/1999 |
| EP | 0 477 400 A | 4/1992 |

* cited by examiner

*Primary Examiner*—Paul J. Hirsch
(74) *Attorney, Agent, or Firm*—Michael J. Striker

(57) ABSTRACT

A valve for controlling fluids has a piezoelectric unit (3) for actuating a valve member (2) that is displaceable in a bore (8) of a valve body (9), having at least one control piston (7) and at least one actuating piston (10) for actuating a valve closing member (9). Between the control piston (7) and the actuating piston (10), a hydraulic chamber (11) functioning as a hydraulic coupler is embodied; the actuating piston (10), defining the hydraulic chamber (11), is supported displaceably in a blind bore (12) of the control piston (7), which bore is open in the valve seat direction. A cross-sectional area (A0), bordering the hydraulic chamber (11), of the control piston (7) on the one hand and a smaller cross-sectional area (A1) of the actuating piston (10) and a cross-sectional area (A2) of at least one reducing element (14) determine a boost for the stroke length of the actuating piston (10), during which the at least one reducing element (14) is braced on a stop (15) in the bore (8) (Drawing figure).

11 Claims, 1 Drawing Sheet

VALVE FOR CONTROLLING LIQUIDS

PRIOR ART

Figure 1:
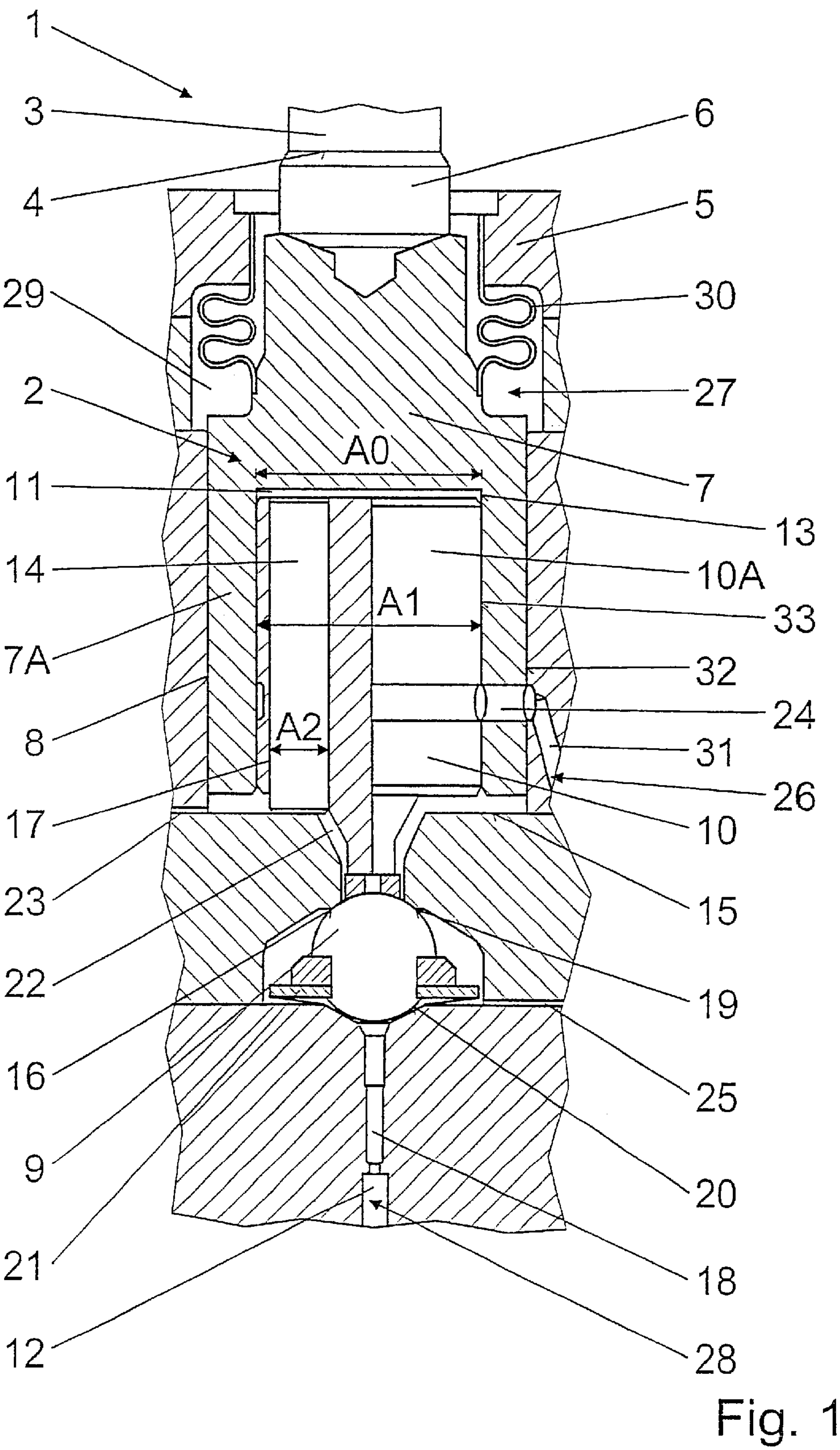

The invention is based on a valve for controlling fluids in accordance with the type defined in further detail in claim 1.

From European Patent Disclosure EP 0 477 400 A1, a valve which is actuatable via a piezoelectric actuator is already known. This known valve has an arrangement for an adaptive, mechanical tolerance compensation, acting in the stroke direction, for a travel transformer of the piezoelectric actuator, in which the deflection of the piezoelectric actuator is transmitted via a hydraulic chamber. The hydraulic chamber, which functions as a so-called hydraulic booster, encloses a common compensation volume between two pistons defining it, one of which is embodied as an actuating piston with a smaller diameter and is connected to a valve closing member to be triggered, and the other piston is embodied as a control piston with a larger diameter and is connected to the piezoelectric actuator. By way of this compensation volume, tolerances resulting from temperature gradients or different temperature expansion coefficients of the materials used and possible settling effects, can be compensated for without thereby causing any change in the position of the valve closing member.

The hydraulic chamber is fastened between the two pistons in such a way that the actuating piston executes a stroke that is lengthened by the boosting ratio of the piston diameter, when the larger piston is moved by a certain travel distance by means of the piezoelectric actuator. The valve member, pistons and piezoelectric actuator are located on a common axis, one after the other.

A disadvantage in such valves is especially the great structural length, which results from the pistons disposed longitudinally one after the other, and which is a major obstacle when only little installation space is available.

Also in such valves, the leakage losses from the hydraulic chamber along a gap surrounding the control piston or the actuating piston are problematic, since these losses can cause a perceptible loss of efficiency.

The described disadvantages of the known embodiments pertain above all to servo valves for triggering fuel injection valves embodies as common rail injectors, in which high efficiency is desired but only very limited installation space is available.

ADVANTAGES OF THE INVENTION

The valve according to the invention for controlling fluids, as defined by the characteristics of claim 1, having an actuating piston which is disposed in a blind bore of the control piston, and having at least one reducing element to accomplish the boost, advantageously requires only very little installation space.

Furthermore with the valve of the invention, the leakage losses from the hydraulic chamber can be reduced markedly, since far less fluid can escape through the sealing gaps between the control piston, actuating piston and reducing element, which gaps in the embodiment of the invention extend parallel, than via the necessarily larger circumferential faces of a control piston and actuating piston that are disposed serially one after the other.

Because of the low leakage losses, especially at low boosting ratios, better efficiency is achieved. Moreover, a smaller or shorter piezoelectric actuator can be used, which makes it possible to lower the production costs for the valve of the invention markedly, since the dimensioning of the piezoelectric actuator is a significant cost factor.

The boosting ratio is structurally achieved in an especially simple way in the valve of the invention by way of the area ratios between the cross-sectional area of the control piston at the hydraulic chamber, that is, the bottom face of the blind bore, and the cross-sectional area that is composed of the cross section of the actuating piston and the cross section of the at least one reducing element.

In a highly advantageous refinement of the invention, it can be provided that the actuating piston, together with the at least one reducing element, is displaceable for a first portion of its maximum stroke length, and that the actuating piston from the time it reaches the stop executes a remaining stroke length for the at least one reducing element in the bore of the valve body.

This takes into account the finding that while the piezoelectric actuator does furnish a large force reserve as long as the actuator stroke is short, nevertheless the maximum stroke of piezoelectric actuators is also short. With a graduated boost according to the invention, however, it is advantageously possible to bring a major force to bear on the valve closing member for a first portion of the maximum stroke length, since the boosting ratio relative to the control piston is 1:1. Thus the valve closing member can be opened counter to a very high pressure. Once the reducing element has reached its stop, the actuating piston can, depending on the dimensioning, overcome a remaining stroke length with lesser force.

With this kind of embodiment according to the invention of the valve, the piezoelectric actuator can furthermore be reduced still further in size, since to execute the requisite stroke length, the maximum actuator force is now needed for only a small stroke length.

With its embodiment according to the invention, the valve is especially suitable as a servo valve for triggering a fuel injection valve for internal combustion engines, in particular a common rail injector, in which only very limited installation space is available, and in which the servo valve must be opened counter to a high rail pressure, so that a flow specified by an injection needle through the valve seat of the valve closing member is made possible.

Further advantages and advantageous features of the subject of the invention can be learned from the description, drawing and claims.

DRAWING

One exemplary embodiment of the valve of the invention for controlling fluids is shown in the drawing and will be explained in further detail in the ensuing description.

The sole drawing FIGURE shows a schematic, fragmentary view of an exemplary embodiment of the invention for a fuel injection valve for internal combustion engines, in longitudinal section.

DESCRIPTION OF THE EXEMPLARY EMBODIMENT

The exemplary embodiment shown in the drawing illustrates a use of the valve of the invention in a fuel injection valve 1 for internal combustion engines of motor vehicles. The fuel injection valve 1 is embodied here as a common rail injector; the injection of Diesel fuel is controlled via the pressure level in a valve control chamber 12, which communicates with a supply of high pressure.

For adjusting the injection onset, a duration of injection, and an injection quantity in the fuel injection valve 1, which in this case is not designed to be force-balanced, a multi-part valve member 2 is triggered via a piezoelectric unit embodied as a piezoelectric actuator 3, and the piezoelectric actuator 3 is disposed on the side of the valve member 2 remote from the valve control chamber and from the combustion chamber.

The piezoelectric actuator 3, constructed in the manner known per se in a plurality of layers, has an actuator head 4 on its side toward the valve member 2, while on its side remote from the valve member it has an actuator foot 5. Via a support 6, a control piston 7 of the valve member 2 rests on the actuator head 4. The valve member 2 is axially displaceable in a bore 8, embodied as a longitudinal bore, of the valve body 5 and includes not only the control piston 7 but also an actuating piston 10 that actuates a valve closing member 9; the control piston 7 and the actuating piston 10 are coupled to one another by means of a hydraulic booster.

The hydraulic booster is embodied with a hydraulic chamber 11, by way of which the deflection of the piezoelectric actuator 3 is transmitted. The hydraulic chamber 11 is embodied in a blind bore 13 of the control piston 7, which bore is open in the valve seat direction and in which the actuating piston 10 is supported displaceably, thus defining the hydraulic chamber 11 in the valve seat direction. The boosting ratio is the result of the ratio between the cross-sectional area A0 of the control piston 7 adjacent to the hydraulic chamber 11, on the one hand, and the smaller cross-sectional area A1 of the actuating piston 10 on the other.

To compensate for the difference between the cross-sectional area A1 of the actuating piston 10 and the larger cross-sectional area A0 at the control piston, a reducing element 14 embodied as a bolt is provided for the actuating piston 10; the reducing element is inserted into a through bore 17 embodied axially in the actuating piston 10, and with a cross-sectional area A2 it adjoins the hydraulic chamber 11. The cross-sectional area A1 of the actuating piston 10 and the cross-sectional area A2 of the reducing element together, not counting gap faces, make up the cross-sectional area A0 of the control piston 7 adjacent to the hydraulic chamber 11. Upon actuation of the control piston 7 via the hydraulic chamber 11, a displacement of the actuating piston 10 in the valve seat direction is possible over at least a portion of its maximum stroke length, while the bolt 14 provided as a reducing element is braced against a stop 15 in the bore 8.

In the embodiment shown in the drawing, the length of the bolt 14 is selected to be greater than the length of a region 10A of the actuating piston 10 that has the cross-sectional area A1 adjacent to the compensation volume of the hydraulic chamber 11. The cross section of the actuating piston 10 narrows from this region 10A toward a contact face 16 for the valve closing member 9.

In further embodiments according to the invention, it is understood that it can also be provided that there are more than one bolt as a reducing element, or that the reducing element takes some other form, such as an annular form.

The reducing element 14 can also be made somewhat shorter in the valve seat direction, making a graduated boost possible, in which the actuating piston 10 initially, together with the reducing element 14, is displaceable for a first portion of its maximum stroke length, namely until the reducing element comes to rest on the stop 15, which is preferably embodied at a parting face of the valve body 5, which is embodied in split form. With the 1:1 coupling that is operative up to that point, a major force can be brought to bear on the valve closing member 9, while in the ensuing continued motion of the actuating piston 10 alone, a long residual stroke can be executed, which assures a stable operation of the fuel injection valve 1, since on the one hand the valve position is unambiguous, and on the other, an outlet throttle 18 that is typical for common rail injectors can reliably cavitate.

To attain this effect, it can suffice to shorten the reducing element 14, compared to the version described previously above, by such a slight order of magnitude that given the size ratios indicated, this variant is only imperceptibly different in drawing terms from the version now shown in the drawing.

The valve closing member 9, which here is embodied with ball caps and is provided on the end of the valve member 2 toward the valve control chamber, cooperates with valve seats 19, 20 embodied on the valve body 5; a spring device 21 is associated with the lower valve seat 20 and keeps the valve closing member 9 against the upper valve seat 19 upon relief of the valve control chamber 12. The valve seats 19, 20 are embodied in a first valve chamber 22, formed in the valve body 5, that communicates with a leakage outlet conduit 23 and with a compensation conduit 25, leading to a valve system pressure chamber, of a filling device 26.

The valve closing member 9, which it is understood can also cooperate with only a single valve seat in an alternative embodiment, divides a low-pressure region 27 at a system pressure from a high-pressure region 28 at a high pressure or rail pressure.

On the end of the valve member 2 toward the piezoelectric actuator, the bore 8 is adjoined by a second valve chamber 29, which is defined on one side by the valve body 5 and on the other by a sealing element 30 that is connected to the control piston 7 and the valve body 5; the sealing element 30 is embodied here as a bellowslike diaphragm and prevents the piezoelectric actuator 3 from coming into contact with the fuel contained in the low-pressure region 27.

Via the filling device 26, during a pause between triggering events of the piezoelectric actuator 3, or between times when electrical current is delivered to it, the hydraulic chamber 11 is refilled with hydraulic fluid from the high-pressure region 28 to compensate for a leakage quantity from the low-pressure region 27. To that end, a channel-like hollow chamber 31 discharges into the system pressure chamber 24 of the low-pressure region 27, which is embodied as a bore in a region 7A of the control piston 7 surrounding the actuating piston 10, between a gap 32 surrounding the control piston 7 and a gap 33 surrounding the actuating piston 10.

It is understood that still other structural versions of the system pressure chamber are also conceivable, and that the filling device 26 can have a suitable throttling relative to the high-pressure region 28 as well as a suitable device for letting off any overpressure.

The fuel injection valve 1 of the drawing functions as described below.

In the closed state of the fuel injection valve 1, that is, when there is no current to the piezoelectric actuator 3, the valve closing member 9 of the valve member 2 is kept in contact with the upper valve seat 19 by the high pressure or rail pressure in the high-pressure region 28, so that no fuel from the valve control chamber 12, communicating with a high-pressure reservoir (common rail) that is common to a plurality of fuel injection valves, can reach the first valve chamber 22 and then escape through the leakage outlet conduit 23.

Upon a slow actuation, as occurs in a temperature-dictated change in length of the piezoelectric actuator 3 or other valve components, the control piston 7 presses in the valve seat direction, reducing the size of the compensation volume of the hydraulic chamber 11, and upon a temperature drop retracts accordingly, without this having any overall effects on the closing and opening position of the valve member 2 and the fuel injection valve 1.

For fuel injection, the valve closing member 9 must be opened counter to the flow direction and thus counter to the rail pressure in the high-pressure region 28. The actuator force required for this is generated by the piezoelectric actuator 3, which when supplied with electrical current abruptly expands axially and by displacement of the control piston 7 in the valve seat direction builds up a certain pressure in the hydraulic chamber 11. Thus via the hydraulic chamber 11, a hydraulic force which is equivalent to the force of the piezoelectric actuator 3 acts upon the actuating piston 10 as well as the reducing element or bolt 14. Since in the embodiment shown the reducing element 14 is braced against the shoulder 15 in the bore 8 of the valve body 5, only the actuating piston 10 is moved by a stroke, which is greater in length, the greater the size of the cross-sectional area A2 of the reducing element 14 is in comparison to the cross-sectional area A1 of the actuating piston 10.

In the double seat valve shown in the drawing, the valve closing member 9 is put into a middle position between the two valve seats 19, 20 and is then moved into a closing position at the lower valve seat 20, as a result of which no further fuel from the valve control chamber 12 reaches the first valve chamber 22.

If the current supply to the piezoelectric actuator 3 is interrupted, the piezoelectric actuator becomes still shorter, and the valve closing member 9 is put into the middle position between the two valve seats 19, 20, and a new fuel injection takes place. After the pressure reduction in the valve chamber 22 through the leakage outlet conduit 23, the valve closing member 9 moves into its closing position at the upper valve seat 9, in which it is held by the spring device 21.

Each time the piezoelectric actuator 3 is triggered, a fuel injection and a requisite refilling of the hydraulic chamber 11 are performed in the valve 1 of the invention; in the high-pressure region 28, as a result of axial motions of a valve control piston in the valve control chamber 12, an injection valve is supplied with fuel in a manner known per se.

Although the exemplary embodiment relates to a fuel injection valve that is not force-balanced, it is understood that the invention can also be employed in force-balanced valves. The invention is not limited to fuel injection valves but is instead suitable for all valves with a piezoelectric actuator system, in which a valve closing member divides a high-pressure region from a low-pressure region, as in pumps, for example.

What is claimed is:

1. A valve for controlling fluids, having a piezoelectric unit (3) for actuating a valve member (2) which is displaceable in a bore (8) of a valve body (9) and which has at least one control piston (7) and at least one actuating piston (10) for actuating a valve closing member (9) that cooperates with at least one valve seat (19, 20), provided on the valve body (5), for opening and closing the valve (1), and having a hydraulic chamber (11), functioning as a tolerance compensation element and as a hydraulic booster, between the control piston (7) and the actuating piston (10), characterized in that the control piston (7) has a blind bore (12), open in the valve seat direction, in which the actuating piston (10) is supported displaceably, defining the hydraulic chamber (11), and a respective cross-sectional area (A0) of the control piston (7), bordering the hydraulic chamber (11), corresponds at least approximately to a smaller cross-sectional area (A0) of the actuating piston (10) together with a cross-sectional area (A2) of at least one reducing element (14), and a boost is provided such that the actuating piston (10), for at least a portion of its maximum stroke length, is displaceable in the valve seat direction, while the at least one reducing element (14) is braced on a stop (15) in the bore (8).

2. The valve of claim 1, characterized in that a graduated boost is performed such that the actuating piston (10), together with the at least one reducing element (14), is displaceable for a first portion of its maximum stroke length, and that the actuating piston (10) from the time it reaches the stop (15) executed a remaining stroke length for the at least one reducing element (14).

3. The valve of claim 1, characterized in that the at least one reducing element is embodied as a bolt (14), which is inserted into a through bore (17) embodied axially in the actuating piston (10).

4. The valve of claim 1, characterized in that the length of the bolt or bolts (14) is greater than the length of the region (10A) of the actuating piston (10) with its cross-sectional area (Al).

5. The valve of claim 1, characterized in that the cross section of the actuating piston (10) tapers toward a contact face (16) for the valve closing member (9).

6. The valve of claim 1, characterized in that the stop (15) for the bolt or bolts (14) is embodied as a shoulder in the bore (8) of the valve body (5), preferably at a dividing face of the valve body (5).

7. The valve of claim 1, characterized in that the actuating piston (10) borders a first valve chamber (22), in which the at least one seat (19, 20) for the valve closing member (9) is provided, and the valve closing member (9) divides a low-pressure region (27) in the valve (1) from a high-pressure region (28), and that the control piston (7) is surrounded, in a region adjoining the bore (8) of the valve body (5), by a second valve chamber (29).

8. The valve of claim 7, characterized in that a filling device (26) for compensating for the leakage quantity from the low-pressure region (27) by withdrawing hydraulic fluid from the high-pressure region (28) is provided, and the filling device (26) in the valve body (5) is embodied with a channel-like hollow chamber (31), which discharges into a system pressure chamber (24) of the low-pressure region (27), preferably into a gap (32, 33) surrounding the control piston (7) and/or the actuating piston (10), and which discharges on the high-pressure side, preferably into the first valve chamber (22).

9. The valve of claim 8, characterized in that the system pressure chamber (24) is embodied as a bore in a region (7A) of the control piston (7) surrounding the actuating piston (10), and the system pressure chamber (24) discharges into the gap (33) surrounding the actuating piston (10).

10. The valve of claim 1, characterized in that it is embodied as intrinsically non-force-balanced.

11. The valve of claim 1, characterized by its use as a component of a fuel injection valve for internal combustion engines, in particular of a common rail injector (1).

* * * * *